(12) United States Patent
Karlsson (10) Patent No.: US 6,179,368 B1
(45) Date of Patent: Jan. 30, 2001

(54) HITCH-MOUNTED FOLD-OUT CAMPER

(76) Inventor: Ronny Bernt Karlsson, 2421 Brennan Dr., Plano, TX (US) 75075

( * ) Notice: Under 35 U.S.C. 154(b), the term of this patent shall be extended for 0 days.

(21) Appl. No.: 09/318,944

(22) Filed: May 26, 1999

(51) Int. Cl.[7] .................................................. B60R 15/00
(52) U.S. Cl. ......................... 296/161; 296/159; 135/88.13
(58) Field of Search ....................................... 296/159, 161; 135/88.01, 88.02, 88.07, 88.08, 88.13, 88.15, 88.16

(56) References Cited

U.S. PATENT DOCUMENTS

| | | | |
|---|---|---|---|
| 1,712,836 | * | 5/1929 | Mills . |
| 3,756,649 | * | 9/1973 | Wines ................................. 296/23 R |
| 3,863,977 | * | 2/1975 | Hardinge ................................. 296/23 |
| 4,065,166 | * | 12/1977 | Shoemaker ................................. 296/23 |
| 4,504,049 | * | 3/1985 | Straub ................................. 296/165 |
| 4,729,594 | * | 3/1988 | Hoff ................................. 296/161 |
| 4,858,986 | * | 8/1989 | Whitley et al. ................................. 296/165 |
| 4,867,502 | * | 9/1989 | Sylvester et al. ................................. 296/161 |
| 4,886,411 | * | 12/1989 | Pieperhoff et al. ................................. 414/408 |
| 5,066,065 | * | 11/1991 | Baughman ................................. 296/165 |
| 5,358,298 | * | 10/1994 | Fate ................................. 276/26 |
| 5,419,607 | * | 5/1995 | Oliviera ................................. 296/159 |
| 5,738,130 | * | 4/1998 | Thomas ................................. 135/88.13 |
| 5,934,726 | * | 8/1999 | Bosset ................................. 296/26.11 |
| 6,070,925 | * | 6/2000 | Moldofsky ................................. 296/26.08 |

FOREIGN PATENT DOCUMENTS

| | | | |
|---|---|---|---|
| 943577 | * | 3/1974 | (CA) . |
| 26-24-607 | * | 12/1977 | (DE) ................................. 296/161 |
| 856005 | * | 5/1940 | (FR) . |

* cited by examiner

Primary Examiner—D. Glenn Dayoan
Assistant Examiner—Mickki D. Murray (57) ABSTRACT

A modular fold-out camping unit so designed as to be carried largely by a vehicle's hitch receiver for transportation while independently supported to the ground with height adjustable legs while in use. The standard is comprised of a, largely hitch supported, load-carrying base plate, supported by a regular or extended hitch arm, creating the floor, or part of the floor, of the camper, with optional additional floor boards attached with hinges as to be unfolded into an extended floor area whereupon an enclosure in form of a semi permanent tent structure is erected.

14 Claims, 7 Drawing Sheets

HITCH-MOUNTED FOLD-OUT CAMPER

BACKGROUND OF THE INVENTION

1. Field of the Invention

The present invention relates generally to a camping unit solely or partly built on and supported by a vehicle hitch arm connected to a vehicles regular hitch receiver. More specifically, the present invention relates to a modular camping shell utilizing a vehicle hitch receiver and/or the bumper of a vehicle as its sole support for transportation but can be used either connected or disconnected from the vehicle while in use (unfolded).

2. Description of Prior Art

Previous proposals have been patented in which existing interior and/or exterior space of a vehicle has been extended to accommodate a sleeping area. Applicant is aware of the following U.S. Pat. Nos.:

|     | U.S. Pat. No. | INVENTOR      |
| --- | ------------- | ------------- |
| (1) | 5,066,065     | Baughman      |
| (2) | 5,011,216     | Baughman      |
| (3) | 4,065,166     | Shoemaker     |
| (4) | 4,858,986     | Whitley et al.|
| (5) | 4,109,954     | Wall          |
| (6) | 4,139,229     | Cooper        |
| (7) | 4,729,594     | Hoff          |
| (8) | 5,419,607     | Oliveira      |

While these proposals address certain similar problems, particularly those related to lack of sleeping space in today's vehicles, they are all merely an extension of the vehicle's interior and/or exterior and can not be used independently of the vehicle. Also when compacted they all reside within the boundary of the vehicle significantly altering the available interior and/or exterior space of the vehicle as to negatively effect the function, economy and comfort of said vehicle.

No prior art is known, however, for a hitch-mounted camping devise that is carried on a vehicle hitch-arm, without additional support of wheels like in a trailer, but can be used independently of the vehicle when unfolded.

BRIEF SUMMARY OF THE INVENTION

The principal object of the present invention is to provide a fold-out living area supported and carried in its folded state by a hitch receiver and in its unfolded state by the means of height adjustable fold-out legs to the ground. In brief summary, the present invention overcomes the aforesaid problems of the prior art by providing an independent camping unit utilizing the carrying capability of a standard hitch receiver used for pulling campers, trailers, and such (without removing the function of the hitch) or alternately, in case no hitch receiver is available, clamped to a vehicle's bumper or frame. The fold-out floor sections, comprised of one or more sections, as well as the tent, mattresses and bedding accessories are all contained within the present folding camper. This invention comprises an expandable, substantially rigid floor section made of one or more floor boards hinged together in such way that they can either be unfolded to create an elevated floor space large enough for a living space or folded to fit on a vehicle's hitch arm. On this floor space is a tent semi-permanently mounted in such way to be easily erected when unfolding the floor boards. These floor-boards are further supported to the ground by means of expandable legs in such way that when unfolded, this camping unit is totally self-supported and can consequently be disconnected from the vehicle creating a vehicle-independent camper unit similar to a wheeled camper. In its folded (collapsed) state these floor sections will create a hard shell that crates the interior and tent part of the camper. The support legs are concealed within the floor sections in the collapsed state. It is also an object of the present invention to provide such a device that is of a simple, inexpensive construction. Another object is to provide such device in a lightweight form that can be disassembled as a unit or in parts for storage. Consequently the tent is removable with the means of snaps and each floor section can be disconnected as an item for storage.

These and other objects and features of the present invention will be apparent from the detailed description taken with reference to the accompanying drawings.

BRIEF DESCRIPTION OF THE DRAWINGS

For a more complete understanding of the present invention and the advantages thereto, reference is now made to the following Description, taken in conjunction with the accompanying Drawing in which.

DETAILED DESCRIPTION

Figure 1:
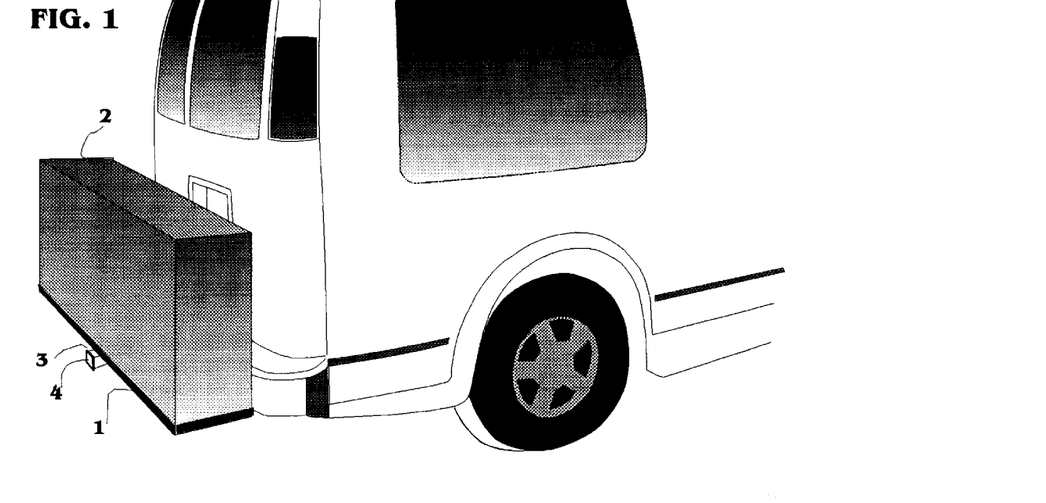
FIG. 1 is a perspective view of the "Hitch mounted Fold-out Camper" in its folded state, resting largely on a vehicles hitch arm.

The preferred embodiment of the present invention will now be described in connection with the above-mentioned drawings. Refer now to FIG. 1, which is an overall conceptual drawing of a preferred embodiment of the "Hitch-mounted Fold-out Camper", hereafter referred to as the "Camper", in its folded, covered state. Here we can see the compacted "Camper" [FIG. 1 (1)] covered with a weather-proof cover [FIG. 1 (2)]. A preferred cover, due to its light weight, would be vinyl but any lightweight, weather proof, material including hard-sided material could be used. In this case the "Camper" is mounted on an extended Hitch-arm [FIG. 1 (3) and FIG. 17 (3)] with an additional rear hitch receiver [FIG. 1 (4) and FIG. 17 (4)]. A regular 2 inch hitch arm utilizing a 2-inch, ¼ inch walls, square pipe (Class 3 hitch) will allow a 1.5-inch hitch-arm to be fitted inside said 2 inch arm, creating a Class 2 hitch [FIG. 17 (5)], enough to tow a mid-size trailer/boat.

Figure 2:
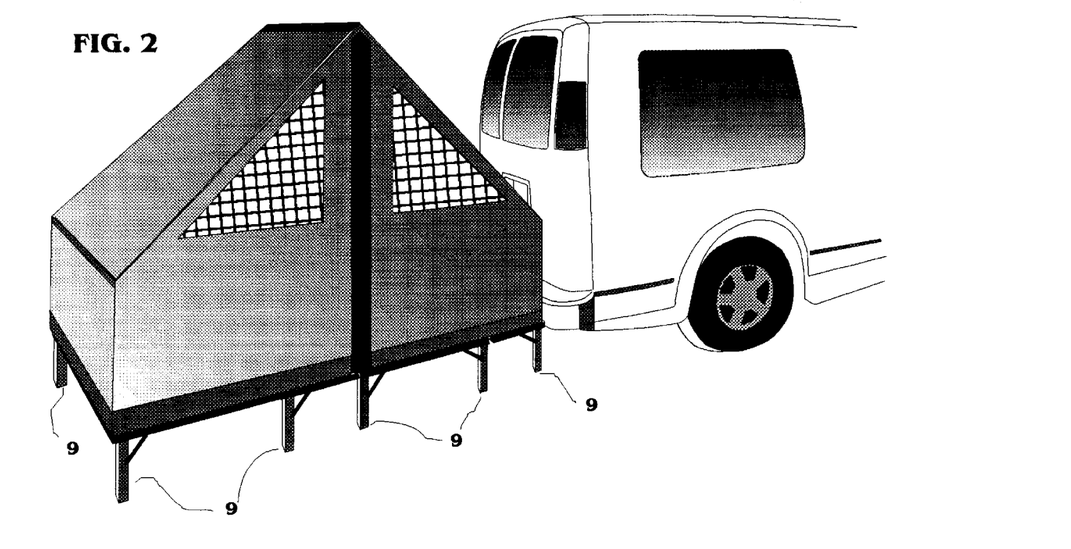
FIG. 2 is a perspective view of the "Hitch mounted Fold-out Camper" in its unfolded state, with the tent erected and ready for use.
Figure 12:
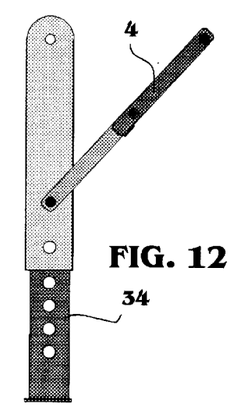
FIG. 12 is a close-up of the height-adjustable fold-out legs.

FIG. 2 is a conceptual drawing of a preferred embodiment of the "Camper" in its unfolded, for camping, usable state. In this case the unit is still connected to the car but it could very well be unhooked as an independent camper by pulling the pin [FIG. 17 (7)] holding the Hitch-arm to the vehicle's hitch-receiver [FIG. 17 (8)]. As the unit is totally supported by the ground with its adjustable fold-out legs [FIG. 2 (9)] there is no need to keep it attached to the vehicle. FIG. 12 show a close-up of the "Height-adjustable Fold-out legs", hereafter referred to as the "Legs", with its lockable support arm (6) and adjustable inner tube (34).

Figure 3:
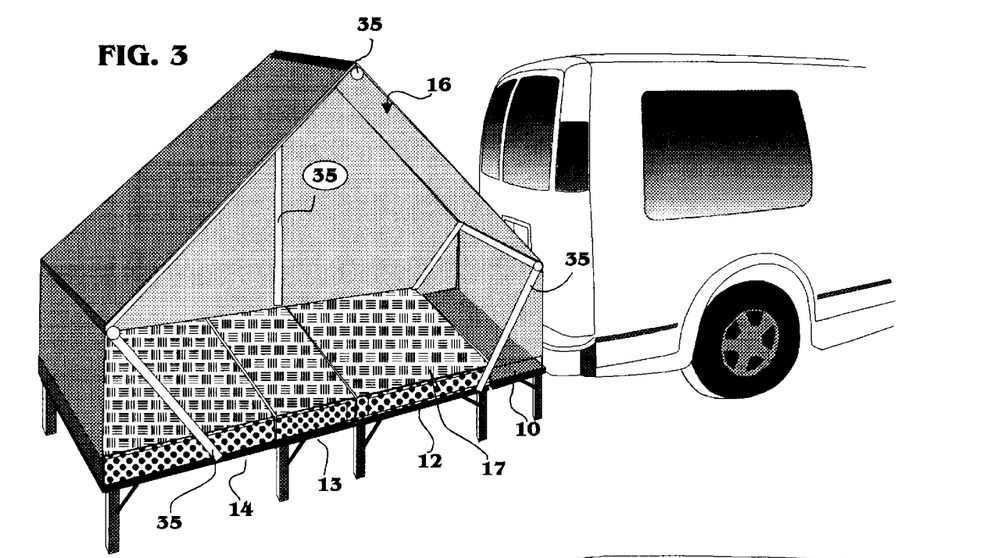
FIG. 3 Shows a cut-away of the same concept but with the front panel of the tent removed for easier viewing.
Figure 15:
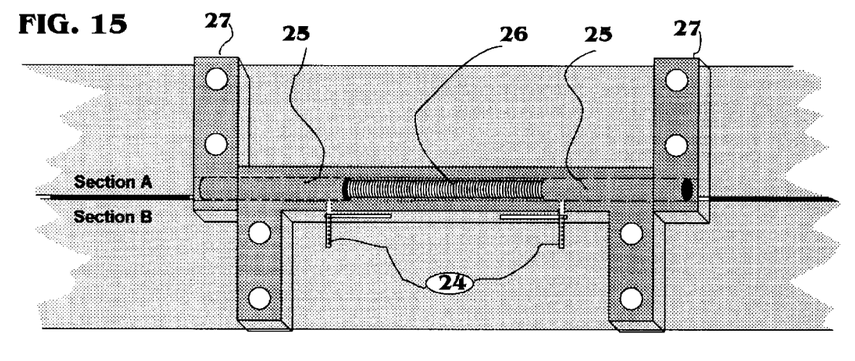
FIG. 15 is a close up of the quick release hinges used between each section.

FIG. 3 is a cut-away drawing of the basic concept to better illustrate the invention. In basic terms, the unit is comprised of one or more floor board [FIG. 3 (10)] with at least one of them attached to the vehicle's receiver. In this case the forward floor board [FIG. 3 (10)], from here on referred to as the "Base-plate", is mounted to the vehicles hitch-arm [FIG. 17 (3)]. To this "Base-plate" are possibly one or more floor-boards attached. In this sample three additional floor-boards [FIG. 3 (12)(13)(14)]. They are in turn connected with the means of quick-release hinges [FIG. 11 (15) with detailed drawing [FIG. 15], so as to be able to unfold the said floor-boards into a largely flat surface (floor) supported to the ground with the "Legs" [FIG. 12]. Around the peripheral of this "floor" is an easily erected tent enclosure [FIG. 3 (16)] semi-permanently, by means of readily available canvas-snaps, mounted to create a living space while unfolded. Optionally, as shown in FIG. 3, the floor can be wholly or partly covered by semi-permanently installed mattresses [FIG. 3 (17)]. The "Camper" is designed to be able to hold each and all of the bedding equipment as well as the semi permanently mounted tent structure [FIG. 3 (16)] including its tent poles (35), both in its folded state [FIG. 5 (35)] as well as unfolded state [FIG. 3 (35)].

While not in use as a camper the floor sections can all be disassembled as single floor sections and reassembled in the home to be used as a regular everyday bed or a guest bed. In this sample, floor boards [FIG. 3 (12)(13)(14)] can be assembled to create a light-weight king size bed. Although the unit can be made in any size, the preferred sizes are, U.S. double, queen and king not counting the base-plate [FIG. 3 (10)]. The "Base-plate" is designed to be used for storage, heaters, camping gears and such. For larger trucks and vans a 74-inch-wide unit allowing two double beds, arranged crosswise to the vehicles travel direction, can be made. In either case this will allow the "Camper" to use regular form-fitted bedding sheets for the respective size.

Figure 4:
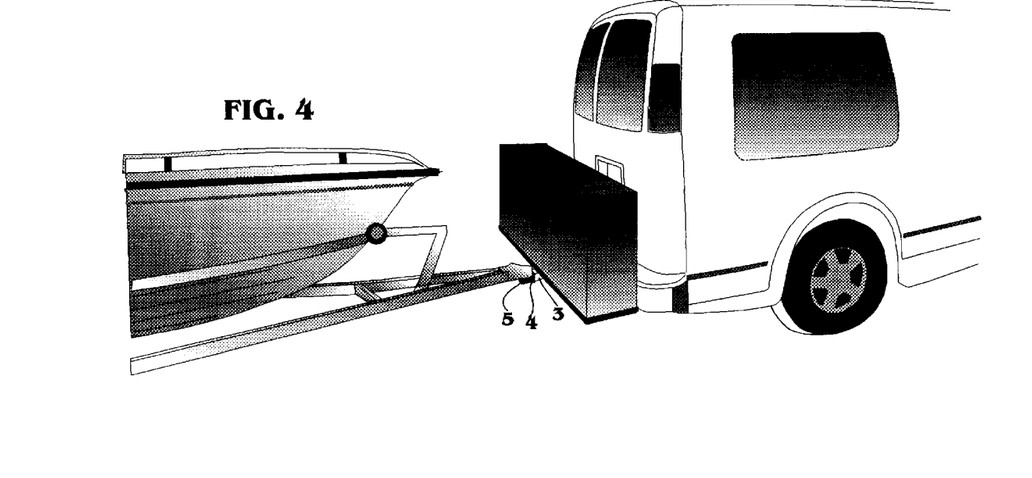
FIG. 4 Shows the "Hitch mounted Fold-out Camper" in its folded state illustrating the additional advantage of being able to still utilize the optional hitch, in this case towing a boat.

FIG. 4 illustrates the additional advantage of being able to simultaneously utilize the towing hitch's normal function, in this case towing a boat. Here the optional Class 2 hitch [FIG. 17 (5)] fitted into the extended Hitch-arm [FIG. 17 (3)] was used to connect the trailer to the "Camper".

Refer now to FIGS. 5 to 8 for an illustrated step-by-step instruction on how to unfold the "Camper". To make the procedure clear the tent canvas has been removed for this demonstration.

Figure 5:
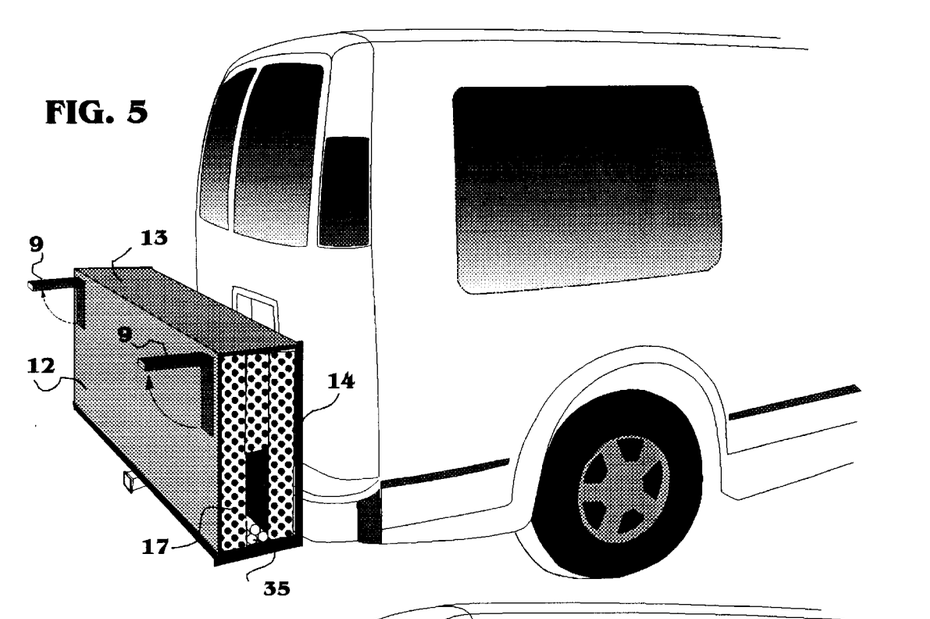
FIGS. 5–8 Demonstrates the steps needed to unfold the "Hitch mounted Fold-out Camper". For this illustration the tent has been removed to make unfolding instruction more obvious.

Step 1. [FIG. 5] Remove the cover. The interior of the Camper" can now be seen with, in this case, the folded mattresses (17) and tent poles (35).

Figure 6:
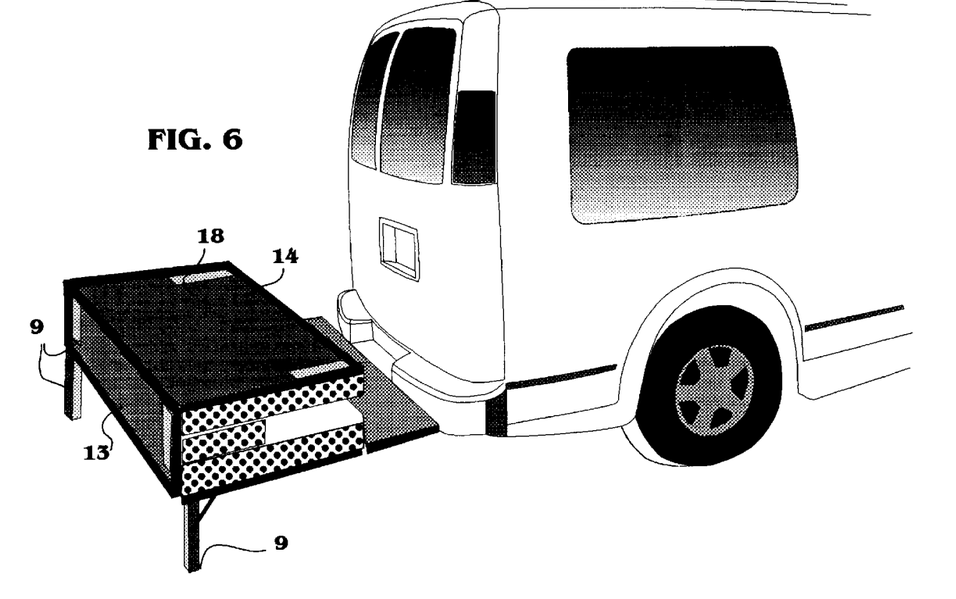
Figures 7, 8:
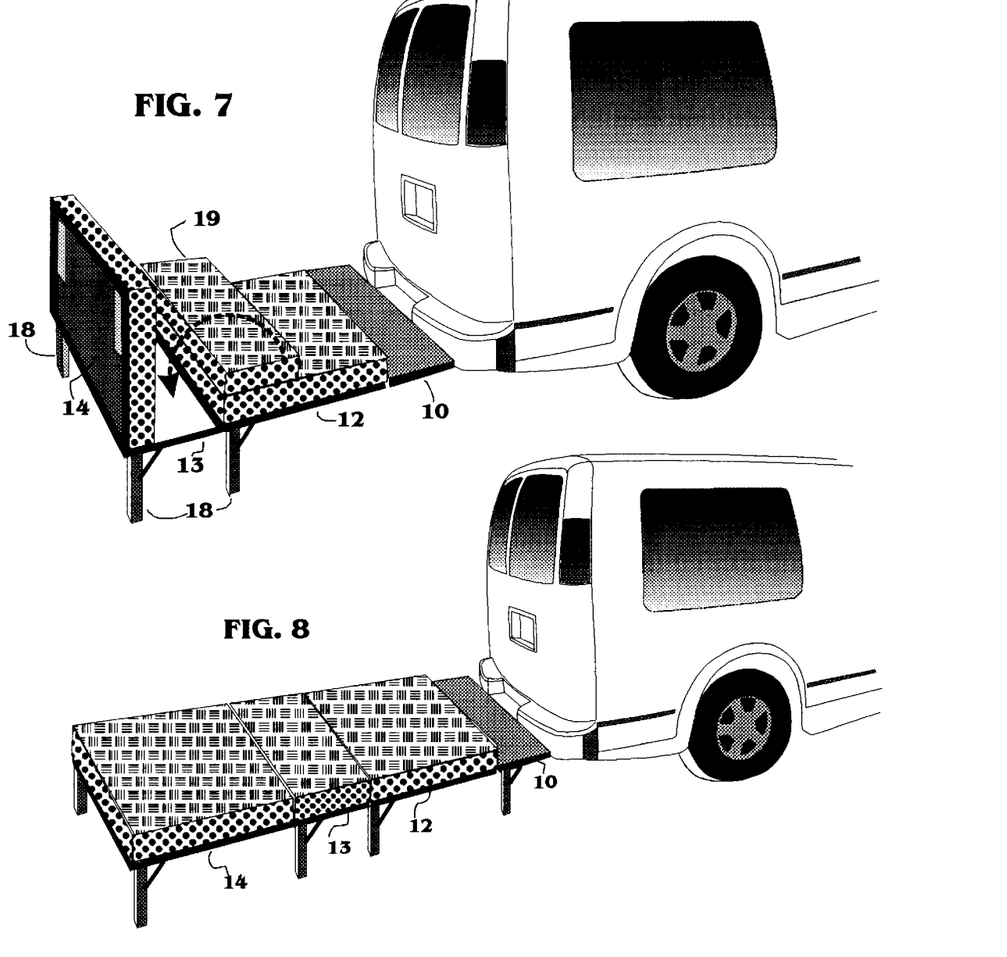

Step 2. Unfold the "Legs" (9) on the rear vertical floor board (12) and swing the unit backward until the "Legs" rest on the ground as in (FIG. 6).

Step 4. Do the same with floor board (13) and lower it to the ground. [FIG. 7].

Step 5. Again do the same with floor board [FIG. 8 (14)]. In case a foldable mattress is used it can now be flipped [FIG. 7 (19)] into place. The only thing left at this point is to erect the normally attached tent. Again for this demonstration the tent canvas has not been shown to make the demonstration clear although the steps with the canvas attached are the same.

Figure 9:
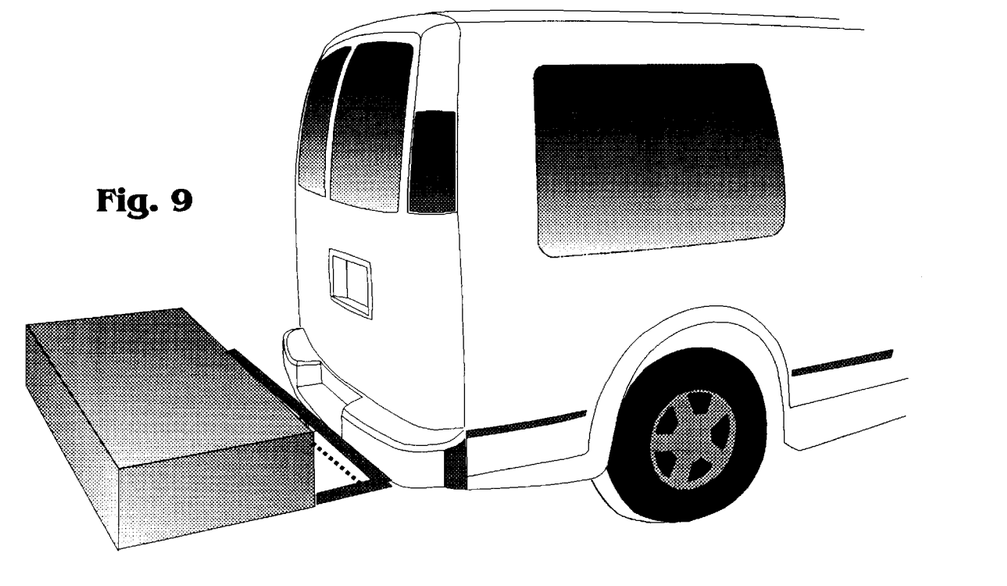
FIG. 9 illustrates how the folded "Hitch mounted Fold-out Camper" can be swung back to allow easy access to the rear doors of the vehicle.
Figure 10:
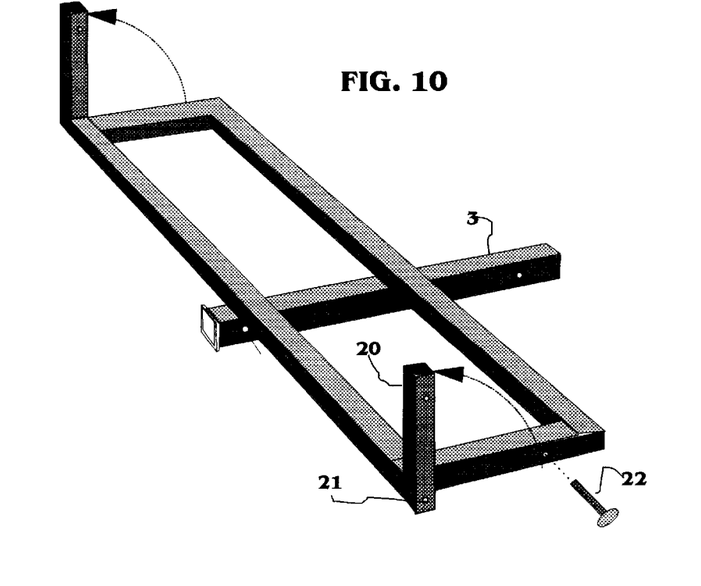
FIG. 10 is a side view of the modified hitch arm illustrating the hinge principle to allow the "Hitch mounted Fold-out Camper" to be swung back.

While in its folded state the whole unit can be folded back, as illustrated in [FIG. 9], to be able to access the vehicle's back door. This is accomplished by adding a hinged swing arm [FIG. 10 (20)] to each side of the extended hitch-arm [FIG. 10 (3)] with a rear pivot point [FIG. 10 (21)]. By pulling the forward pin [FIG. 10 (22)] the compacted, folded, "Camper" can swing back as a unit [FIG. 9] and thereby allow easy access to the rear of the vehicle.

Figure 11:
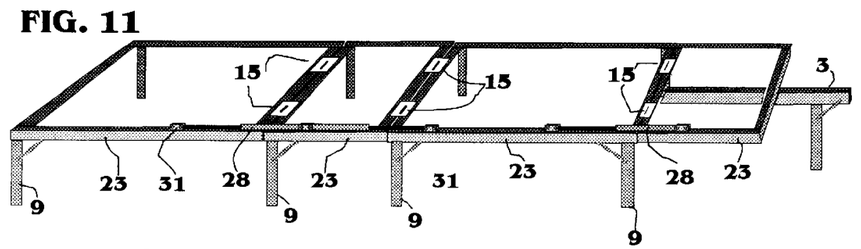
FIG. 11 is a drawing of the frame work for the floor boards sections with the hinges between each section as well as an optional angulation limiting device.
Figure 13:
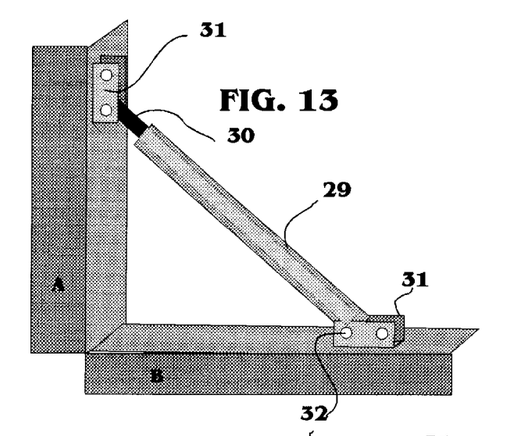
FIGS. 13 and 14 is a close-up of an angulation limiting device used when folding the unit to prevent each section to fold beyond its preferred, in folded state, 90 degree angle.
Figure 14:
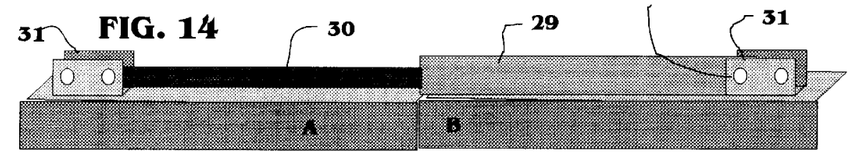

FIG. 11 shows the framework for the "Camper" as well as the suggested hardware used in the assembly. The frame (23) is preferably made of lightweight aluminum covered by any light-weight material, solid or soft, such as plywood or stretched canvas [FIG. 3 (10)]. Each Fold-out frame has at least two "Legs" (9), detailed in FIG. 12. It also illustrates the locations of the quick release hinges between the Fold-out sections [FIG. 11 (15)]. A detailed illustration of the hinges can be found in FIG. 15. As seen on this partially cut-away drawing [FIG. 15] of the quick-release hinge, the two sections A and B can be easily separated by pressing the two release levels (24) compressing the spring (26). This forces the two hinge pins (25) to pull out of the two hinge sections (27) attached to section A, thereby disconnecting the two floor sections. This will allow for quick assembly as well as disassembly of the unit, breaking it down to smaller, light-weight, floor boards that can be easily handled, stored as flat units, or used as a regular bed by reassembling the sections in the home. To prevent the floor sections from folding beyond 90 degrees while folding the unit and to make the unit more rigid while folded, each section also contains an angulation limiting device (28) detailed in FIGS. 13 and 14. This angulation device is comprised of a tube (29) and a rod (30) inserted to each other and attached in one end of each rod/tube to a hinge-bracket (31) which in turn is fixed to the frames for the floor-boards. The length of the rod is so designed as to reach the tube's hinge pin (32) when the two sections reach an angle of 90 degrees preventing further angulation. Although not a required addition, it greatly helps in handling the unit.

Figure 16:
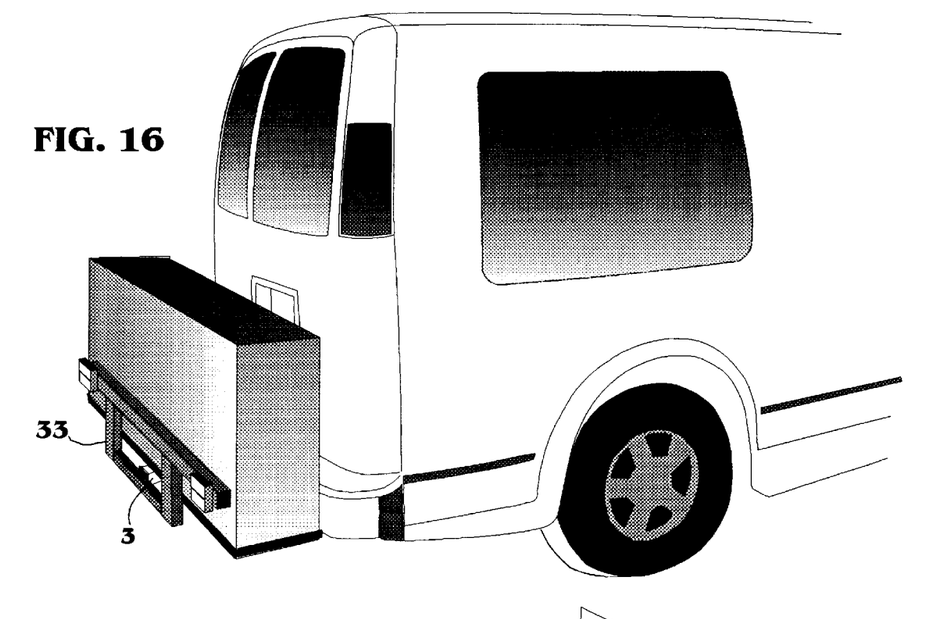
FIG. 16 shows the use of an optional light bar/license holder in case the "Hitch-mounted Fold-out Camper" covers the vehicles rear light and/or license plate.

FIG. 16 illustrates the use of an optional rear light-bar/license plate holder (33) inserted into the rear end of the extended hitch-arm (3). This is only needed in case the folded "Camper" would cover the vehicles rear lights or license plate. The electrical hookup to the vehicle is made by using the regular trailer light outlet just like a trailer. This light bar could in addition be outfitted with a tow hitch as illustrated in FIG. 17 (5).

Figure 17:
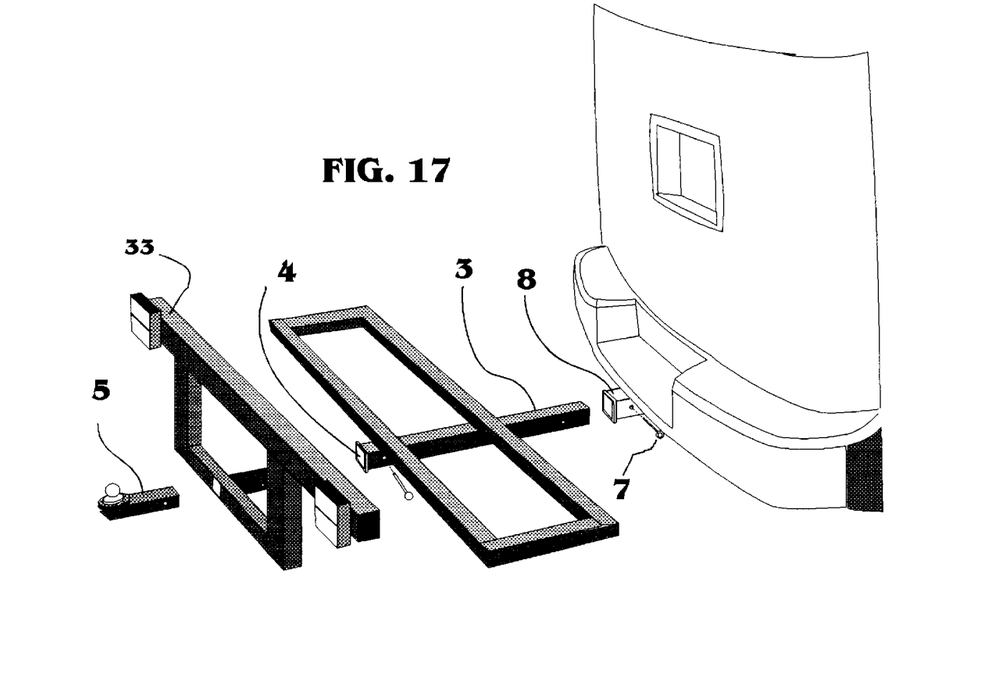
FIG. 17 is a conceptual drawing of an extended hitch arm used to carry the "Hitch-mounted Fold-out Camper", complete with an optional Light-bar/License holder and/or a rear ball mount to allow the towing of a trailer while still being able to carry the "Hitch-mounted Fold-out Camper".

FIG. 17 (3) is a perspective view of a preferred Extended Hitch-arm that the "Camper" is resting on. The rear end of the extended hitch arm (4) with its square hole (hitch receiver) can also be seen. This "receiver' will allow for an optional hitch arm/ball-holder and/or the previously mentioned light-bar (33) to be fitted to said extended hitch-arm.

The forgoing description of the preferred embodiment of the invention has been presented for the purpose of illustration and description. It is not intended to be exhaustive or to limit the invention to the precise form disclosed. Many modifications and variations are possible in light of the above teaching. It is intended that the scope of the invention be limited not only by this detailed description, but rather by the claims appended hereto.

What is claimed is:

1. A modular hitch-mounted fold-out camper comprising:
    a base plate that forms a first floor section of the camper, said base plate being horizontally mountable to a vehicle hitch arm;
    at least one additional floor section hingedly connected to the base plate so as to rotate from a vertical position when stored to a horizontal position when deployed;
    a plurality of fold-out legs connected to each floor section for holding the floor section in an elevated horizontal position level with the base plate; and
    an enclosure structure attached to the base plate and the floor section that forms a tent-like enclosure over the floor section when erected.

2. The modular hitch-mounted fold-out camper of claim 1 wherein a plurality of additional floor sections are hingedly connected to each other, such that a leading edge of each floor section is hingedly connected to a trailing edge of an adjacent floor section, whereby the plurality of floor sections form an elevated floor area when folded out from the base plate.

3. The modular hitch-mounted fold-out camper of claim 2 further comprising a plurality of removable hinges that connect the floor sections, said hinges being removable to disconnect the floor area from the base plate, and to disconnect floor sections from the floor area.

4. The modular hitch-mounted fold-out camper of claim 1 wherein the enclosure structure is manufactured from a soft-sided material.

5. The modular hitch-mounted fold-out camper of claim 1 wherein the enclosure structure is manufactured from a hard-sided material.

6. The modular hitch-mounted fold-out camper of claim 1 wherein the enclosure structure is manufactured from a combination of soft-sided and hard-sided materials.

7. The modular hitch-mounted fold-out camper of claim 1 wherein the enclosure structure is removable from the base plate and floor section.

8. The modular hitch-mounted fold-out camper of claim 1 further comprising a light bar/license plate holder for supporting tail lights and holding a license plate when the floor section is in the vertical stored position.

9. The modular hitch-mounted fold-out camper of claim 1 further comprising an extended vehicle hitch arm that extends from the vehicle to a position beyond the base plate, the extended hitch arm including a ball-mount for attaching a trailer behind the camper when the floor section is in the vertical stored position.

10. The modular hitch-mounted fold-out camper of claim 9 further comprising a light bar/license plate holder for supporting tail lights and holding a license plate when the floor section is in the vertical stored position, said light bar being attached to a back end of the extended vehicle hitch arm.

11. The modular hitch-mounted fold-out camper of claim 1 further comprising an extended vehicle hitch arm that extends from the vehicle to a position beyond the base plate, the extended hitch arm including a hitch-receiver in a back end for receiving an additional hitch arm.

12. The modular hitch-mounted fold-out camper of claim 1 wherein the base plate is hingedly connected to the vehicle hitch arm by a transverse hinge at a back edge of the base plate so that the camper and base plate are rotatable as a unit when the floor section is in the vertical stored position, so as to rotate the unit outward and downward from the vehicle in order to provide access to a rear door of the vehicle.

13. A modular fold-out camper mounted on a vehicle comprising:
    a base plate that forms a first floor section of the camper, said base plate being horizontally mountable to a frame of the vehicle;
    at least one additional floor section hingedly connected to the base plate so as to rotate from a vertical position when stored to a horizontal position when deployed;
    a plurality of fold-out legs connected to each floor section for holding the floor section in an elevated horizontal position level with the base plate; and
    an enclosure structure attached to the base plate and the floor section that forms a tent-like enclosure over the floor sections when erected.

14. A modular fold-out camper mounted on a trailer comprising:
    a base plate that forms a first floor section of the camper, said base plate being horizontally mountable to a frame of the trailer;
    at least one additional floor section hingedly connected to the base plate so as to rotate from a vertical position when stored to a horizontal position when deployed;
    a plurality of fold-out legs connected to each floor section for holding the floor section in an elevated horizontal position level with the base plate; and
    an enclosure structure attached to the base plate and the floor section that forms a tent-like enclosure over the floor sections when erected.

* * * * *